United States Patent
Gurvich (10) Patent No.: US 11,592,062 B2
(45) Date of Patent: Feb. 28, 2023

(54) COMPOSITE LUG WITH ENHANCED PERFORMANCE

(71) Applicant: Hamilton Sundstrand Corporation, Charlotte, NC (US)

(72) Inventor: Mark R. Gurvich, Middletown, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 905 days.

(21) Appl. No.: 16/392,261

(22) Filed: Apr. 23, 2019

(65) Prior Publication Data
US 2020/0340528 A1   Oct. 29, 2020

(51) Int. Cl.
| | |
|---|---|
| *F16C 17/02* | (2006.01) |
| *F16C 33/20* | (2006.01) |
| *B29C 70/68* | (2006.01) |
| *B29C 70/86* | (2006.01) |
| *B32B 5/12* | (2006.01) |
| *B32B 5/26* | (2006.01) |
| *B29L 31/00* | (2006.01) |

(52) U.S. Cl.
CPC .......... *F16C 33/201* (2013.01); *B29C 70/681* (2013.01); *B29C 70/86* (2013.01); *B32B 5/12* (2013.01); *B32B 5/26* (2013.01); *F16C 17/02* (2013.01); *B29L 2031/727* (2013.01)

(58) Field of Classification Search
CPC ........ F16C 17/02; F16C 33/201; F16C 33/04; B29C 70/86; B29C 70/681; B32B 5/12; B32B 5/26; B29L 2031/727; B29L 2031/045

USPC .......................................................... 428/221
See application file for complete search history.

(56) References Cited

U.S. PATENT DOCUMENTS

| | | | |
|---|---|---|---|
| 3,056,167 A | * | 10/1962 | Knoppel ............ B29D 99/0007 425/111 |
| 3,900,357 A | | 8/1975 | Huchette et al. |
| 4,809,402 A | | 3/1989 | Rainville |
| 5,080,385 A | | 1/1992 | Duplessis |
| 5,755,558 A | | 5/1998 | Reinfelder et al. |
| 6,324,940 B1 | | 12/2001 | Pazdirek |
| 8,216,658 B2 | | 7/2012 | Rajabali et al. |

(Continued)

FOREIGN PATENT DOCUMENTS

| | | | | |
|---|---|---|---|---|
| WO | WO-9406127 A1 | * | 3/1994 | ......... B29C 37/0085 |
| WO | WO-2019105629 A1 | * | 6/2019 | ........... B29C 70/222 |

OTHER PUBLICATIONS

Anonymous, "Composite Sucker Rods" Online Retrieved 2019, URL<https://www.rockwestcomposites.com/composite-sucker-rods-oil-pumping>, 3 pages.

(Continued)

*Primary Examiner* — Matthew D Matzek
(74) *Attorney, Agent, or Firm* — Cantor Colburn LLP (57) ABSTRACT

A composite part is provided and includes a component, a first set of first composite plies with finite lengths and a second set of second composite plies with finite lengths. A respective end of each of the first composite plies is wrapped around the component in a clockwise wrapping direction and includes first fibers. A respective end of each of the second composite plies is wrapped around the component in a counter-clockwise wrapping direction and includes second fibers.

16 Claims, 4 Drawing Sheets

(56) References Cited

U.S. PATENT DOCUMENTS

2016/0271465 A1* 9/2016 Mordasini .............. B29C 53/60
2019/0113095 A1* 4/2019 Wolf-Monheim ...... B32B 5/028

OTHER PUBLICATIONS

Anonymous, "Lightweight Aircraft Composite Structures" Online retrieved 2019, URL<http://www.ctgltd.com/solutions/aircraft-composite-structures>, 4 pages.

Thuis, "Composite Landing Gear Components for Aerospace Applications", ICAS 2004, 24th International Congress of the Aeronautical Sciences, 8 pages.

Wallin et al. "Load Response and Failure of Thick RTM Composite Lugs", ICAS 2002 Congress, 9 pages.

Wallin et al., "RTM Composite Lugs for High Load Transfer Applications", ICAS 2006, 25th International Congress of the Aeronautical Sciences, 9 pages.

European Search Report Application No. EP19212105; dated Jul. 13, 2020; pp. 8.

* cited by examiner

COMPOSITE LUG WITH ENHANCED PERFORMANCE

BACKGROUND

The following description relates to composites and, more specifically, to a composite lug with enhanced performance.

High tensile properties of composite materials make them promising for use in numerous aerospace applications where the composite materials are exposed to primarily uniaxial loads such as, for example, actuators and linkages. A major challenge in such cases is efficient load transfer from composite rods to other components. The most common way to address this challenge is to use metallic joints at rod ends.

Metallic joints can, however, increase overall weight, make the entire component more expensive, and may create additional issues, such as corrosion, needs for regular inspection, increased transversal size, etc.

While there are existing attempts to have fully composite designs (i.e., composite designs with composite or non-metallic ending parts), these solutions present issues as well. One of several typical approaches here is to drill holes and machine surrounding areas in composite components to generate composite lugs. Although these solutions visually look like "metallic lugs," their structural performance is relative weak, since high strength fibers are not fully used and polymer matrix materials are typically a driving reason for failures.

Moreover, although advanced, fully composite components (including ending parts and joints) can be fabricated by complex fabrication methods, for example, by braiding techniques, such techniques are usually associated with higher costs and design limitations. At the same time, depending on design and manufacturing implementations, the structural performance of resulting parts may be still limited by risks of polymer damage, since such components usually require post-fabrication machining.

BRIEF DESCRIPTION

According to an aspect of the disclosure, a composite part is provided and includes a component, a first set of first composite plies with finite lengths and a second set of second composite plies with finite lengths. A respective end of each of the first composite plies is wrapped around the component in a clockwise wrapping direction and includes first fibers. A respective end of each of the second composite plies is wrapped around the component in a counter-clockwise wrapping direction and includes second fibers.

In accordance with additional or alternative embodiments, the component includes a bushing and the first and second composite plies include one or more of thermoset and thermoplastic polymer matrices.

In accordance with additional or alternative embodiments, the first and second fibers are at least one of: unidirectional [0], provided with one or more combinations of [+α/−α], [0/+α/−α], [0/90] and [0/+α/−α/90] fiber directionality and provided with fabric reinforcement layup configurations.

In accordance with additional or alternative embodiments, the first and second sets of the first and second composite plies, respectively, are interleaved with one another.

In accordance with additional or alternative embodiments, the first and second sets of the first and second composite plies, respectively, form an angular neck at a distance from the component.

In accordance with additional or alternative embodiments, the first and second sets of the first and second composite plies, respectively, form a rounded neck at a distance from the component.

In accordance with additional or alternative embodiments, additional composite wrapping is disposed about at least the first and second sets of the first and second composite plies, respectively. The additional composite wrapping is oriented transversely relative to the clockwise and counter-clockwise wrapping directions.

According to another aspect of the disclosure, an assembly is provided and includes first and second composite parts according to the composite part and a main body. The first and second composite parts are disposed in parallel and the first and second sets of the first and second composite plies, respectively, of the first and second composite parts extend from the main body.

According to another aspect of the disclosure, a composite part is provided and includes a component, a first composite ply and a second composite ply. The first composite ply includes a first neck section, a first wrapping section extending from the first neck section and around the component in a wrapping direction, a first end section extending from the first wrapping section and disposable in contact with the first neck section and first fibers oriented in parallel with the wrapping direction. The second composite ply includes a second neck section disposable in contact with the first neck and end sections, a second wrapping section extending from the second neck section and disposable around the first wrapping section in the wrapping direction, a second end section extending from the second wrapping section and disposable in contact with the first neck section and second fibers oriented in parallel with the wrapping direction.

In accordance with additional or alternative embodiments, the component includes a bushing and the first and second composite plies include one or more of thermoset and thermoplastic polymer matrices.

In accordance with additional or alternative embodiments, the first and second fibers are at least one of: unidirectional [0], provided with one or more of [+α/−α], [0/+α/−α], [0/90], [0/+α/−α/90] fiber directionality and provided with fabric reinforcement layup configurations.

In accordance with additional or alternative embodiments, additional first and second composite plies are wrapped around the first and second composite plies.

In accordance with additional or alternative embodiments, the first and second composite plies and the additional first and second composite plies are interleaved with one another.

In accordance with additional or alternative embodiments, the first and second composite plies and the additional first and second composite plies form an angular neck at a distance from the component.

In accordance with additional or alternative embodiments, the first and second composite plies and the additional first and second composite plies form a rounded neck at a distance from the component.

In accordance with additional or alternative embodiments, additional composite wrapping is disposed about at least the first and second composite plies and the additional first and second composite plies. The additional composite wrapping is oriented transversely relative to the wrapping direction.

According to yet another aspect of the disclosure, a method of assembling a composite part is provided. The method includes arranging first and second composite plies of finite lengths respectively including first and second fibers at first and second sides of an axis, respectively, disposing a component on the axis, wrapping an end of a first first composite ply, which is closest to the first side of the axis, around the component in the wrapping direction, wrapping an end of a first second composite ply, which is closest to the second side of the axis, around the component in the wrapping direction, wrapping an end of a next first composite ply, which is next closest to the first side of the axis, around the component in the wrapping direction and wrapping an end of a next second composite ply, which is next closest to the second side of the axis, around the component in the wrapping direction.

In accordance with additional or alternative embodiments, the arranging comprises disposing a first tube coaxially inside a second tube, cutting axial cuts into opposite sides of the first tube to form the first first composite ply and the first second composite ply and cutting axial cuts into opposite sides of the second tube to form the next first composite ply and the next second composite ply.

In accordance with additional or alternative embodiments, the first and second tubes are multi-ply tubes.

According to another aspect of the disclosure, an assembly method is provided and includes assembling first and second composite parts according to the method, the first and second composite parts being disposed in parallel, the component including a single elongate cylinder for both the first and second composite parts and the first and second composite plies of the first and second composite parts extending from a main body.

These and other advantages and features will become more apparent from the following description taken in conjunction with the drawings.

BRIEF DESCRIPTION OF THE DRAWINGS

The subject matter, which is regarded as the disclosure, is particularly pointed out and distinctly claimed in the claims at the conclusion of the specification. The foregoing and other features and advantages of the disclosure are apparent from the following detailed description taken in conjunction with the accompanying drawings in which:

These and other advantages and features will become more apparent from the following description taken in conjunction with the drawings.

DETAILED DESCRIPTION

As will be described below, continuous and discontinuous composite plies are combined in various combinations in joint areas. According to the proposed solution, a portion of composite plies having continuous reinforcements are disposed at one side of a bushing or another component and are wrapped around the bushing or the other component toward an opposite side. Another portion of the composite plies have a similar but reverse design. The composite plies of each of the portions can be placed in mutually repeated orders to provide additional transversal compression to ply-ends. Overall, the proposed design includes a family of finite-length composite plies with predominant fiber orientations in the direction of wrapping. Additional variants of the proposed design can include transversal wrapping in areas of ply-ends to minimize risks of local buckling under axial compression.

With reference to FIGS. 1A, 1B, 1C, 1D and 1E, a composite part 101 and a method of assembling the composite part 101 are provided.

Figure 1A:
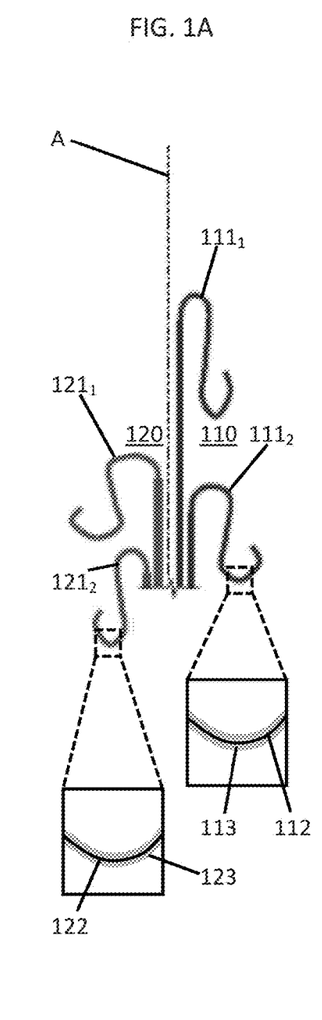
FIG. 1A is a side schematic view of a composite part at an initial stage of assembly in accordance with embodiments.

At an initial stage of assembly, as shown in FIG. 1A, a first set 110 of first composite plies (hereinafter referred to as "first plies") 111 having a specified finite length is arranged or disposed at a first side of an axis A and a second set 120 of second composite plies (hereinafter referred to as "second plies") 121 having a specific finite length is arranged or disposed at a second side of the axis A. Each of the first plies 111 includes first fibers 112, that are provided in bulk and which are unidirectional and formed of one or more of carbon, glass and organic fibers, and one or more of a thermoset and a thermoplastic first polymer matrix 113 in which the first fibers 112 are suspended. Each of the second plies 121 includes second fibers 122, that are provided in bulk and which are unidirectional and formed of one or more of carbon, glass and organic fibers, and one or more of a thermoset and a thermoplastic second polymer matrix 123 in which the second fibers 122 are suspended.

Figure 1B:
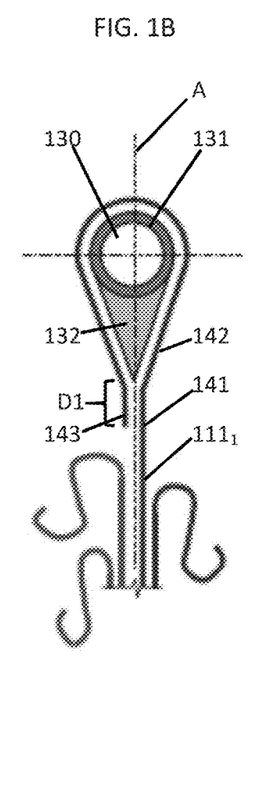
FIG. 1B is a side schematic view of a composite part at an intermediate stage of assembly in accordance with embodiments.

At a first intermediate stage of assembly, as shown in FIG. 1B, a component 130 is disposed on the axis A. The component 130 can include a bushing 131 with or without an apex portion 132. The component 130 can be formed, for example, of one or more of metallic, ceramic, composite and polymeric homogenous or layered materials.

Once the component 130 is disposed on the axis A, an end of a first one $111_1$ of the first plies 111, which is closest to the first side of the axis A, is wrapped around the component 130 in a counter-clockwise wrapping direction. The end of the first one $111_1$ of the first plies 111 includes a first neck section 141, a first wrapping section 142 that extends from an end of the first neck section 141 and around the component 130 in the counter-clockwise wrapping direction and a first end section 143. The first end section extends from an end of the first wrapping section 142 and is disposable in contact with an end of the first neck section 141. An end of the first end section 143 terminates at a distance D1 from the closest portion of the component 130 (e.g., the peak point of the apex 132). The first fibers 112 of the first one $111_1$ of the first plies 111 can be oriented in parallel with the counter-clockwise wrapping direction or can have other orientations as will be described below.

Figures 1C, 1D, 1E:
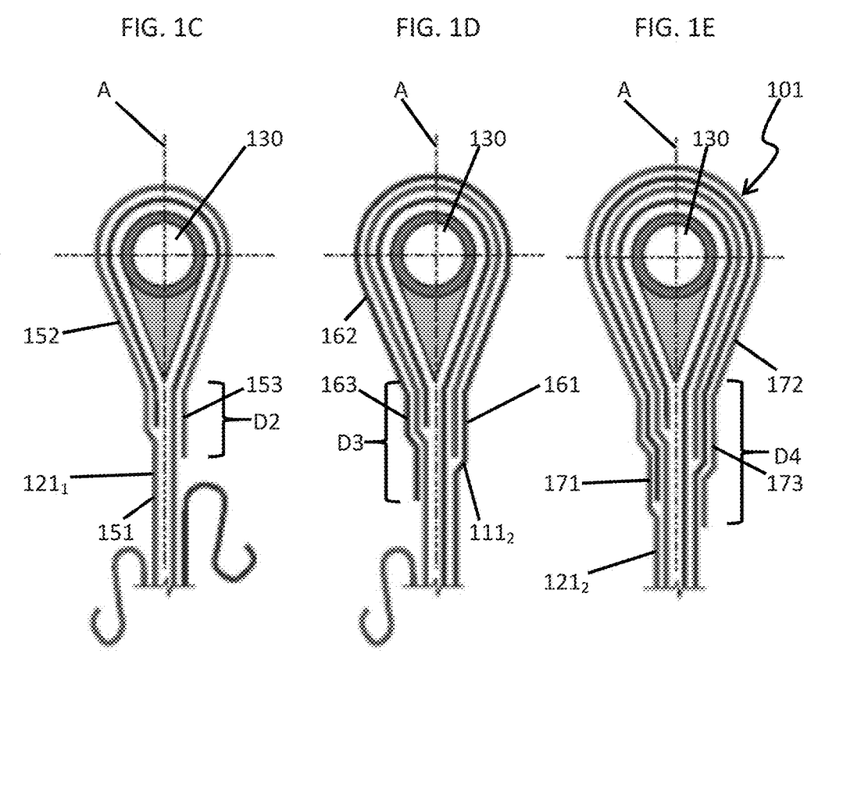
FIG. 1C is a side schematic view of a composite part at an intermediate stage of assembly following a stage shown in FIG. 1B in accordance with embodiments.
FIG. 1D is a side schematic view of a composite part at an intermediate stage of assembly following a stage shown in FIG. 1C in accordance with embodiments.
FIG. 1E is a side schematic view of a composite part at a late stage of assembly following a stage shown in FIG. 1D in accordance with embodiments.

At a next intermediate stage of the assembly, as shown in FIG. 1C, an end of a first one $121_1$ of the second plies 121, which is closest to the second side of the axis A, is wrapped around the component 130 in a clockwise wrapping direction. The end of the first one $121_1$ of the second plies 121 includes a second neck section 151 that is disposable in contact with the first neck section 141 and the first end section 143, a second wrapping section 152 that extends from an end of the second neck section 151 and is disposable around the first wrapping section 142 in the clockwise wrapping direction and a second end section 153. The second end section 153 extends from an end of the second wrapping section 152 and is disposable in contact with the end of the first neck section 141. An end of the second end section 153 terminates at a distance D2, which may exceed but is not required to exceed D1 due to a length of the first one $121_1$ of the second plies 121 exceeding a length of the first one $111_1$ of the first plies 111, from the closest portion of the component 130. The second fibers 122 of the first one $121_1$ of the second plies 121 can be oriented in parallel with the counter-clockwise wrapping direction or can have other orientations as will be described below.

At a next intermediate stage of the assembly, as shown in FIG. 1D, an end of a next one $111_2$ of the first plies 111, which is next closest to the first side of the axis A, is wrapped around the component 130 in a counter-clockwise wrapping direction. The end of the next one $111_2$ of the first plies 111 includes a neck section 161 that is disposable in contact with the first neck section 141 and the second end section 153, a wrapping section 162 that extends from an end of the neck section 161 and is disposable around the second wrapping section 152 in the counter-clockwise wrapping direction and an end section 163. The end section 163 extends from an end of the wrapping section 162 and is disposable in contact with the end of the second neck section 151. An end of the end section 163 terminates at a distance D3, which may exceed but is not required to exceed D2 due to a length of the next one $111_2$ of the first plies 111 exceeding the length of the first one $121_1$ of the second plies 121, from the closest portion of the component 130. The first fibers 112 of the next one $111_2$ of the first plies 111 can be oriented in parallel with the counter-clockwise wrapping direction or can have other orientations as will be described below.

At a late stage of the assembly, as shown in FIG. 1E, an end of a next one $121_2$ of the second plies 121, which is next closest to the second side of the axis A, is wrapped around the component 130 in a clockwise wrapping direction. The end of the next one $121_2$ of the second plies 111 includes a neck section 171 that is disposable in contact with the first neck section 151 and the end section 163, a wrapping section 172 that extends from an end of the neck section 171 and is disposable around the wrapping section 162 in the clockwise wrapping direction and an end section 173. The end section 173 extends from an end of the wrapping section 172 and is disposable in contact with the end of the neck section 161. An end of the end section 173 terminates at a distance D4, which may exceed but is not required to exceed D3 due to a length of the next one $121_2$ of the second plies 121 exceeding the length of the next one $111_2$ of the first plies 111, from the closest portion of the component 130. The second fibers 122 of the next one $121_2$ of the second plies 121 can be oriented in parallel with the counter-clockwise wrapping direction or can have other orientations as will be described below.

It is to be understood that although FIGS. 1A, 1B, 1C, 1D and 1E and the accompanying text refer to an example of a total of four ply-ends (respective ends of two first plies 111 and respective ends of two second plies 121), additional first and second plies 111 and 121 could be included in an assembly. In these or other cases, the additional first and second plies 111 and 121 would be provided with a similar construction as described above and their respective ends would be laid down over and around the component 130 in a similar manner as described above. In addition, it is to be understood that the first plies 111 and the second plies 112 can be interleaved with one another as described above or provided in various sequences (e.g., 1:1; 1:2, 3, . . . , n; 2, 3, . . . , n:1; etc.).

For example, each individual first ply 111 or second ply 121 can be defined as a combination of several individual plies. A total number of individual plies at both sides of the axis A can be the same or different. Similarly, positions of ply-ends at both sides of the axis A can be symmetric, close to symmetric with some minor shift as shown on examples of FIG. 1 or can be completely non-symmetric. In addition, it is to be understood that each of the first plies 111 and each of the second plies 121 can have the same or unique thickness, the same or unique reinforcing fibers and the same or unique polymer matrix.

In addition to unidirectionally reinforced first plies 111 and second plies 121 shown as an example in FIG. 1 and follow-up examples at FIGS. 2-6, plies with other fiber reinforcement can be used as well, for example, with layups having one or more of fiber unidirectionality [0], [+α/−α], [0/+α/−α], [0/90] and [0/+α/−α/90] fiber directionality or with fabric reinforcement among others. Here, a is a relatively small angle (α<45 deg) with respect to the wrapping orientation. Each of the first plies 111 and each of the second plies 121 can have the same or different reinforcement layups.

Figure 2:
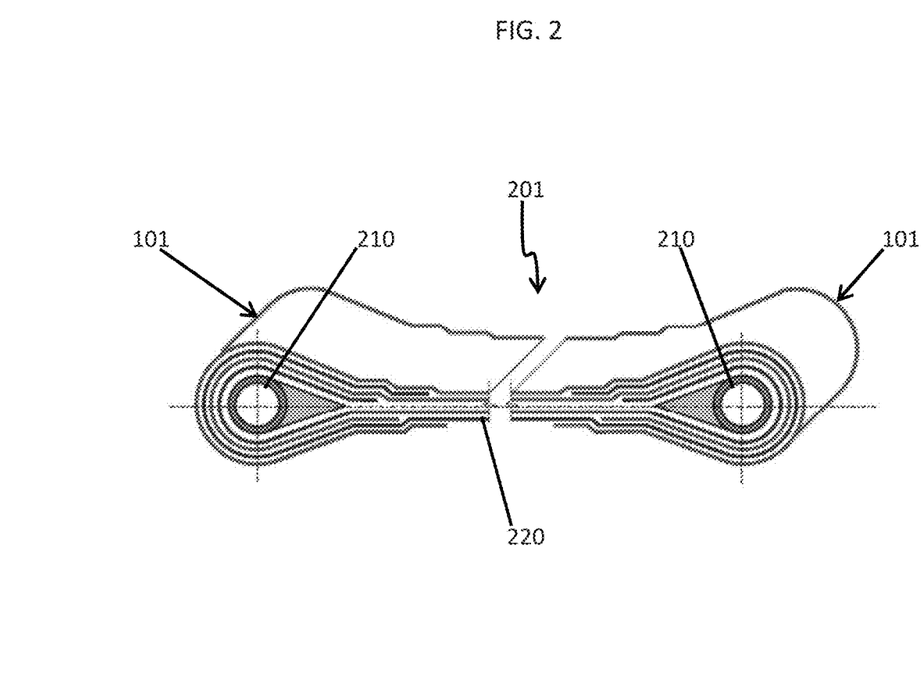
FIG. 2 is a perspective view of a composite part in accordance with embodiments.

With reference to FIG. 2, two composite parts 101 are provided in combination as a component 201 with two lugs. Here, each composite part 101 is disposed at an end of the component 201 with a component 210 through which another element, such as a shaft is extendable. In addition, with the first and second plies 111 and 121 of the two composite parts 101 provided as described above, the component 201 can have a neck 220 between the opposite ends. In an example shown in FIG. 2, the neck 220 has a rectangular cross-section. However, if needed, different shapes of cross-sections of the neck 220 and composites around the components 210 can be easily designed and fabricated by variations of widths of individual plies through the thickness.

Figure 3:
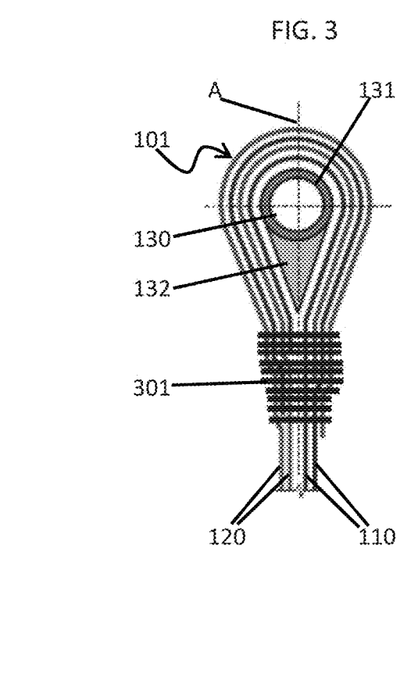
FIG. 3 is a side schematic view of a portion of a composite part including additional composite wrapping in accordance with embodiments.

With reference to FIG. 3 and, in accordance with further embodiments, the composite part 101 can include additional composite wrapping 301. This additional component wrapping 301 can be helpful to mitigate potential risk of local buckling of the first and second plies 111 and 121 under compression or other types of loads. Such additional composite wrapping 301 can have a similar or different construction as the first and second plies 111 and 121 and can be disposed about at least the first and second plies 111 and 121 and any additional plies that may be provided. In some cases, as shown in FIG. 3, the additional composite wrapping 301 can be disposed beyond an end of the apex portion 132 where the first and second plies 111 and 121 meet. In these or other cases, the additional composite wrapping 301 can be oriented transversely relative to the axis A. In other cases, the additional composite wrapping 301 can be oriented under small angle β with respect to the transversal direction within a range of −30 deg<β<+30 deg and the wrapping orientation can be either constant or variable within an individual part. A convenient wrapping orientation can be, for example, [+β/−β] or [0/+β/−β], among others.

Figure 4:
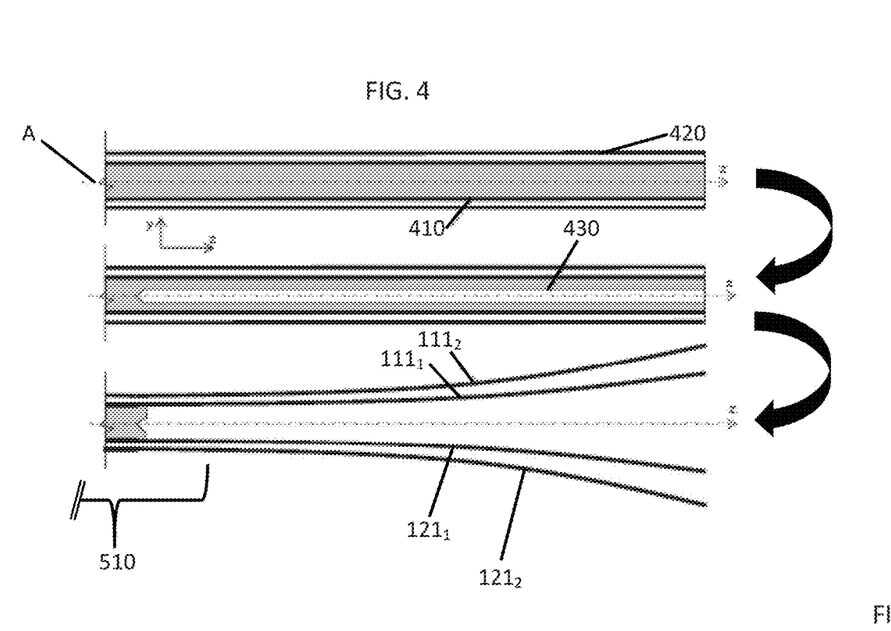
FIG. 4 is an illustration of a method of assembling a composite part with an annular neck in accordance with embodiments.
Figure 5:
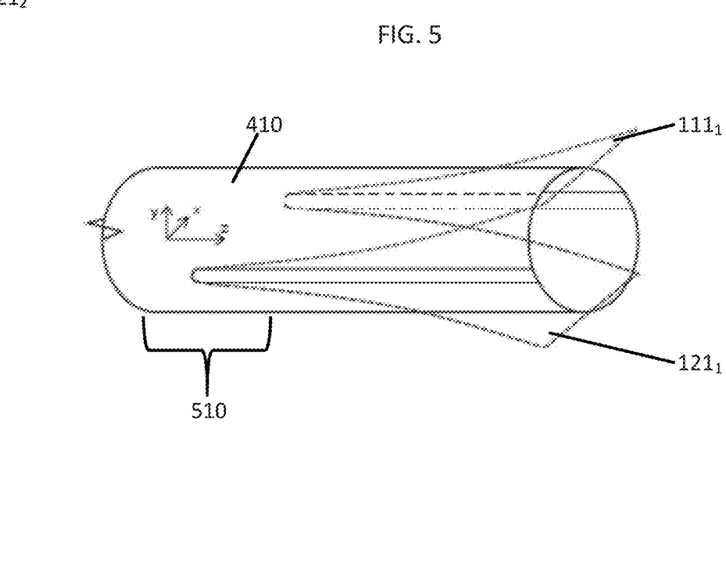
FIG. 5 is a perspective view of a tubular element that is formable into composite plies for a composite part in accordance with embodiments.

With reference to FIGS. 4 and 5, an arrangement of the first plies 111 on the first side of the axis A and an arrangement of the second plies 121 on the second side of the axis A can be accomplished by disposing a first tube 410 coaxially inside a second tube 420. At this point, as shown in FIG. 4, axial cuts 430 are made into opposite sides of the first tube 410 and into similar opposite sides of the second tube 420. The axial cuts 430 in the first tube 410 form an upper half of the first tube 410 into the first one $111_1$ of the first plies 111 and form a lower half of the first tube 410 into the first one $121_1$ of the second plies 121. Similarly, the axial cuts 430 in the second tube 420 form an upper half of the second tube 420 into the next one $111_2$ of the first plies 111 and form a lower half of the second tube 420 into the next one $121_2$ of the second plies 121. Once the axial cuts 430 are made to the first tube 410, for example, as shown in FIG. 5, the first one $111_1$ of the first plies 111 and the first one $121_1$ of the second plies 121 can be bent outwardly into flat or nearly flat shapes that can be fit around the component 130.

With the method of FIGS. 4 and 5, the resulting composite part 101 can be formed with a rounded neck 510 at a distance from the component 130.

Although FIGS. 4 and 5 illustrate an implementation for tubular rods in an example with two tubes, it is to be understood that other embodiments exist. For example, the first tube 410 can be coaxially located inside another the second tube 420 and still other similar or different implementations can be used for more complex multi-ply thick tubular designs. In these other cases, components can be fabricated, for example, by wrapping, by filament-winding techniques or by other relevant manufacturing methods. The only difference in cases of multi-ply tubular design is in a number of first and second plies $111_k$ and $121_k$, where k=1, 2, 3, . . . depending on the thickness of the tube.

Figure 6:
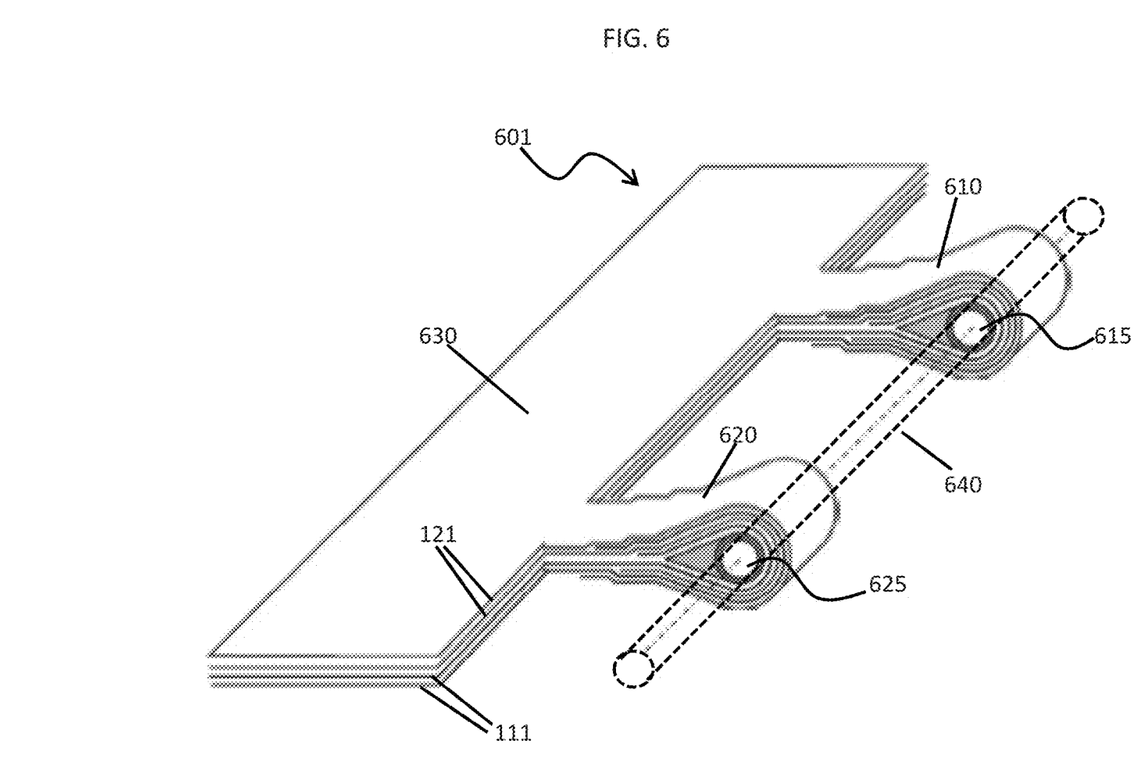
FIG. 6 is a perspective view of an assembly of composite parts in accordance with embodiments.

With reference to FIG. 6 and, in accordance with further embodiments, an assembly 601 is provided and includes first and second composite parts 610 and 620, which are constructed in a similar manner as the composite part 101 as described above, and a main body 630. The first and second composite parts 610 and 620 can have insert components 615 and 625, respectively, which are each similar to the component 130 (see FIG. 1). Here, the first and second composite parts 610 and 620 are disposed in parallel and a component 640 includes or is provided as a single elongate cylinder to transfer load. Both the first and second composite parts 610 and 620 are made using the first and second sets of the first and second plies 111 and 121, respectively, extended from the main body 630.

In a more general case, the main body 630 can have a flat or a curved shape, can have one, two or more composite parts, similar to parts 610 and 620, which can be the same or different, and similarly can have the same or different orientations.

Technical effects and benefits of the present disclosure are the provision of a composite part with continuous or discontinuous plies at critical cross-sections with, correspondingly, equal strength under tension.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A composite part, comprising:
    a component comprising a bushing and an apex portion with a peak point;
    a first set of first composite plies with finite lengths, respective ends of each being wrapped around the bushing and the apex portion with the peak point of the component in a counter-clockwise wrapping direction and comprising first fibers; and
    a second set of second composite plies with finite lengths, respective ends of each being wrapped around the bushing and the apex portion with the peak point of the component in a clockwise wrapping direction and comprising second fibers,
    wherein the first and second sets of the first and second composite plies, respectively, terminate at increasing distances from the peak point.

2. The composite part according to claim 1, wherein the first and second composite plies comprise one or more of thermoset and thermoplastic polymer matrices.

3. The composite part according to claim 1, wherein the first and second fibers are at least one of: unidirectional [0], provided with one or more combinations of [+α/−α], [0/+α/−α], [0/90] and [0/+α/−α/90] fiber directionality and provided with fabric reinforcement layup configurations.

4. The composite part according to claim 1, wherein the first and second sets of the first and second composite plies, respectively, are interleaved with one another.

5. The composite part according to claim 1, wherein the first and second sets of the first and second composite plies, respectively, form an angular neck at a distance from the component.

6. The composite part according to claim 1, wherein the first and second sets of the first and second composite plies, respectively, form a rounded neck at a distance from the component.

7. The composite part according to claim 1, further comprising additional composite wrapping disposed about at least the first and second sets of the first and second composite plies, respectively, the additional composite wrapping being oriented transversely relative to the clockwise and counter-clockwise wrapping directions.

8. An assembly, comprising:
    first and second composite parts according to the composite part of claim 1; and
    a main body,
    wherein the first and second composite parts are disposed in parallel and the first and second sets of the first and second composite plies, respectively, of the first and second composite parts extend from the main body.

9. A composite part, comprising:
    a component comprising a bushing and an apex portion with a peak point;
    a first composite ply comprising a first neck section, a first wrapping section extending from the first neck section and around the bushing and the apex portion with the peak point of the component in a first wrapping direction, a first end section extending from the first wrapping section and disposable in contact with the first neck section and first fibers; and a second composite ply comprising a second neck section disposable in contact with the first neck and end sections, a second wrapping section extending from the second neck section and disposable around the first wrapping section in a second wrapping direction opposite the first wrapping direction, a second end section extending from the second wrapping section and disposable in contact with the first neck section and second fibers, wherein:

the first end section being in contact with the first neck section terminates at a first distance from the peak point, and the second end section being in contact with the first neck section terminates at a second distance, which is greater than the first distance, from the peak point.

10. The composite part according to claim 9, wherein the first and second composite plies comprise one or more of thermoset and thermoplastic polymer matrices.

11. The composite part according to claim 9, wherein the first and second fibers are at least one of: unidirectional [0], provided with one or more combinations of [+α/−α], [0/+α/−α], [0/90] and [0/+α/−α/90] fiber directionality and provided with fabric reinforcement layup configurations.

12. The composite part according to claim 9, further comprising additional first and second composite plies wrapped around the first and second composite plies.

13. The composite part according to claim 12, wherein the first and second composite plies and the additional first and second composite plies are interleaved with one another.

14. The composite part according to claim 12, wherein the first and second composite plies and the additional first and second composite plies form an angular neck at a distance from the component.

15. The composite part according to claim 12, wherein the first and second composite plies and the additional first and second composite plies form a rounded neck at a distance from the component.

16. The composite part according to claim 12, further comprising additional composite wrapping disposed about at least the first and second composite plies and the additional first and second composite plies, the additional composite wrapping being oriented transversely relative to the wrapping direction.

* * * * *